United States Patent
Seki et al.

(10) Patent No.: US 9,847,530 B2
(45) Date of Patent: Dec. 19, 2017

(54) ALUMINUM ALLOY FOIL FOR ELECTRODE COLLECTOR AND PRODUCTION METHOD THEREFOR

(75) Inventors: Masakazu Seki, Chiyoda-ku (JP); Satoshi Suzuki, Chiyoda-ku (JP); Kenji Yamamoto, Chuo-ku (JP); Tomohiko Furutani, Chuo-ku (JP)

(73) Assignees: UACJ CORPORATION, Tokyo (JP); UACJ FOIL CORPORATION, Tokyo (JP)

(*) Notice: Subject to any disclaimer, the term of this patent is extended or adjusted under 35 U.S.C. 154(b) by 348 days.

(21) Appl. No.: 14/235,779

(22) PCT Filed: Jul. 29, 2011

(86) PCT No.: PCT/JP2011/067480
§ 371 (c)(1),
(2), (4) Date: Jan. 28, 2014

(87) PCT Pub. No.: WO2013/018165
PCT Pub. Date: Feb. 7, 2013

(65) Prior Publication Data
US 2014/0205900 A1  Jul. 24, 2014

(51) Int. Cl.
| | | |
|---|---|---|
| C22C 21/00 | (2006.01) |
| C22F 1/04 | (2006.01) |
| H01M 4/66 | (2006.01) |
| C22C 1/02 | (2006.01) |
| B22D 11/06 | (2006.01) |
| B22D 11/12 | (2006.01) |
| B22D 25/04 | (2006.01) |
| H01B 1/02 | (2006.01) |

(52) U.S. Cl.
CPC ......... *H01M 4/662* (2013.01); *B22D 11/0622* (2013.01); *B22D 11/1206* (2013.01); *B22D 25/04* (2013.01); *C22C 1/026* (2013.01); *C22C 21/00* (2013.01); *C22F 1/04* (2013.01); *H01M 4/661* (2013.01)

(58) Field of Classification Search
CPC ....... H01M 4/661; H01M 4/662; C22C 1/026; C22C 21/00; B22D 11/0622; B22D 11/1206; B22D 25/04
See application file for complete search history.

(56) References Cited

U.S. PATENT DOCUMENTS

| | | | | |
|---|---|---|---|---|
| 5,618,358 A * | 4/1997 | Davisson | ................ | C22C 21/00 148/416 |
| 7,172,664 B2 * | 2/2007 | Davisson | ................ | C22C 21/00 148/551 |

FOREIGN PATENT DOCUMENTS

| | | |
|---|---|---|
| JP | 3-291363 A | 12/1991 |
| JP | 06-093397 A | 4/1994 |
| JP | 11-140609 A | 5/1999 |
| JP | 2007-197792 A | 8/2007 |
| JP | 2009-064560 A | 3/2009 |
| JP | 2010-150637 A | 7/2010 |
| JP | 4523390 B2 | 8/2010 |
| JP | 2011-074433 A | 4/2011 |

OTHER PUBLICATIONS

Extended European Search Report dated Jul. 31, 2014, issued in corresponding European Application No. 11 87 0467.5, filed Jul. 29, 2011, 4 pages.
International Search Report dated Oct. 25, 2011, issued in corresponding International Application No. PCT/JP2011/067480, filed Jul. 29, 2011, 2 pages.

* cited by examiner

*Primary Examiner* — Lois Zheng
(74) *Attorney, Agent, or Firm* — Christensen O'Connor Johnson Kindness PLLC

(57) ABSTRACT

An object of the present invention is to provide an aluminum alloy foil for an electrode current collector, the foil having a high strength and high strength after a drying process. The aluminum alloy foil can be manufactured at low cost. Disclosed is an aluminum alloy foil for electrode current collector, including 0.03 to 1.0% of Fe, 0.01 to 0.2% of Si, 0.0001 to 0.2% of Cu, 0.005 to 0.03% of Ti, with the rest being Al and unavoidable impurities. The aluminum alloy foil has Fe solid solution content of 200 ppm or higher, and an intermetallic compound having a maximum diameter length of 0.1 to 1.0 μm in an number density of $2.0 \times 10^4$ particles/mm$^2$ or more.

2 Claims, No Drawings

ALUMINUM ALLOY FOIL FOR ELECTRODE COLLECTOR AND PRODUCTION METHOD THEREFOR

The present invention relates to an aluminum alloy foil suitable for electrode materials used for secondary batteries, electric double-layer capacitors, lithium-ion capacitors, etc., and more particularly to aluminum alloy foils used for a positive electrode material of lithium-ion secondary batteries, aluminum alloy foils used for a negative electrode material of lithium-ion secondary batteries, and manufacturing methods for these alloy foils.

BACKGROUND ART

Lithium-ion secondary batteries with high energy densities have been used as power sources for portable electronics such as a mobile phone and a notebook computer.

An electrode member of a lithium-ion secondary battery includes a positive electrode plate, a separator, and a negative electrode plate. Regarding a positive electrode material, an aluminum alloy foil has been used as a support, having excellent electrical conductivity and less heat generation without affecting electrical efficiency of a secondary battery. An active material having a lithium-containing metal oxide such as $LiCoO_2$ as a chief component is applied on a surface of the aluminum alloy foil. Its production process includes: applying an active material with a thickness of about 100 μm on both sides of an aluminum alloy foil with a thickness of about 20 μm; and providing a heat treatment to remove a solvent therefrom (hereinafter referred to as drying process). Further, in order to increase the density of the active material, compression forming is performed with a pressing machine (hereinafter, this step of compression forming performed with a pressing machine is referred to as press working). The positive electrode plate as so manufactured, a separator, and a negative electrode plate are stacked, and then the resulting stack is wound. After a shaping process is performed so as to encase the stack, it is encased.

An aluminum alloy foil used for an electrode material of a lithium-ion secondary battery has several problems that cuts occur during application of an active material and that ruptures occur at a bending portion during winding. Thus, a higher strength is required. In particular, heat treatment is carried out at about 100 to 180° C. in the drying process. Accordingly, when the strength after the drying process is low, the aluminum alloy foil is easily deformed during press working. This leads to decrease in adhesion between the active material and the aluminum alloy foil. Besides, a rupture is likely to occur during a slitting process. When the adhesion between the active material and a surface of the aluminum alloy foil decreases, their detachment is facilitated during repeated operation of discharge and charge. Unfortunately, this causes its battery capacity to decrease.

Recently, a high electrical conductivity has been also required for an aluminum alloy foil used for an electrode material of a lithium-ion secondary battery. What is meant by the electrical conductivity refers to physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or notebook computers. When a large current flows, a lower electrical conductivity causes internal resistance of a battery to increase. Consequently, this reduces its output voltage. Accordingly, the aluminum alloy foils used for the lithium-ion secondary batteries require high strength for both the foils before and after the drying process, and high electrical conductivity.

Aluminum alloy foils for lithium ion secondary batteries are generally manufactured by semi-continuous casting. In the semi-continuous casting, an ingot is obtained by casting aluminum alloy molten metal. Then, the obtained ingot is subject to hot rolling and cold rolling to give an aluminum sheet (foil material) having a thickness of about 0.2 to 0.6 mm, followed by foil rolling to give the aluminum alloy foil having a thickness of about 6 to 30 μm. Here, homogenization treatment of the ingot and intermediate annealing in the midst of the cold rolling are also generally performed as necessary.

In the continuous casting, a cast sheet is obtained by casting and rolling the aluminum alloy molten metal continuously. Therefore, in the continuous casting, the homogenization treatment of the ingot and the hot rolling, which are the essential steps in the semi-continuous casting, can be omitted. Therefore, yield and energy efficiency can be improved, achieving low manufacturing cost. The typical continuous casting includes twin roll continuous casting and twin belt continuous casting. The cooling speed of the molten metal in these continuous casting is faster than that in the semi-continuous casting. Therefore, the elements added to the aluminum are forced to form solid solution in a supersaturated manner, thereby precipitating uniform and fine crystals of intermetallic compounds. In addition, the cast sheet after the continuous casting can obtain high electrical conductivity by performing heating treatment in the midst of the cold rolling, thereby allowing the supersaturated solid solution of Fe to precipitate. As a result, when compared with the aluminum alloy foil manufactured by the semi-continuous casting, the aluminum alloy foil manufactured by the continuous casting has higher strength.

In general, cast sheet after continuous casting is performed with heat treatment in the middle of cold rollings, in order to improve the rolling property. When heat treatment is performed, Fe dissolved in a supersaturated manner partially precipitates, resulting in decrease of solid solution content of Fe. However, since the finely precipitated intermetallic compound contribute to the dispersion strenghthening, the aluminum alloy foil manufactured by the continuous casting has higher strength than the aluminum alloy foil manufactured by the semi-continuous casting. Here, when the heat treatment is omitted, an aluminum alloy foil with higher strength and higher strength after the drying process can be obtained, due to the high the solid solution content of Fe dissolved in a supersaturated manner and the finely precipitated intermetallic compound. In addition, by omitting the heat treatment performed with the cast sheet after the continuous casting, cost for manufacture can be reduced when compared with the aluminum alloy foil manufactured by the continuous casting which performs heat treatment after the cold rolling.

Patent Literature 1 discloses an aluminum alloy material having excellent corrosion resistance, containing only Fe and having an intermetallic compound with a maximum length of 2.0 μm or longer and aspect ratio of 3 or more distributed by 30/10000 (μm)$^2$. However, since there is no limitation with respect to the amount of Si, the intermetallic compound which precipitate during the continuous casting is likely to become large, which results in decrease in the number of uniform and fine intermetallic compound that contribute to improvement in strength. Although Patent Literature 1 is silent from any particular disclosure with respect to the electrode material, if an aluminum foil is used as the aluminum alloy foil for lithium ion secondary battery, the strength after heat treatment, which simulates a drying process, would be low. This strength is insufficient since the adhesion between the active material and the aluminum alloy foil decreases and the aluminum alloy foil becomes prone to ruptures during a slitting process because the aluminum alloy foil is easily deformed during press working.

Patent Literature 2 discloses an aluminum alloy foil for electrode current collectors used in lithium ion battery, which is manufactured by the semi-continuous casting and has a strength of 160 MPa or higher. However, the strength after heat treatment, which simulates a drying process, would be low. This strength is insufficient since the adhesion between the active material and the aluminum alloy foil decreases and the aluminum alloy foil becomes prone to ruptures during a slitting process because the aluminum alloy foil is easily deformed during press working.

Patent Literature 3 discloses a manufacturing method for an aluminum alloy foil, which includes: obtaining a cast sheet with a thickness of 25 mm or less by continuous casting, then performing cold rolling at the rate of 30% or higher, followed by performing heat treatment at a temperature of 400° C. or higher, and then performing intermediate annealing at a temperature between 250 and 450° C. Although the aluminum alloy foil obtained from this aluminum alloy foil sheet has superior rolling property since heat treatment is performed, the precipitation of each elements that were dissolved in a supersaturated manner would lead to insufficient strength. Such strength is insufficient since the adhesion between the active material and the aluminum alloy foil decreases and the aluminum alloy foil becomes prone to ruptures during a slitting process because the aluminum alloy foil is easily deformed during press working.

CITATION LIST

Patent Literature

[Patent Literature 1] U.S. Pat. No. 4,523,390
[Patent Literature 2] JP 2010-150637A
[Patent Literature 2] JP H6-93397A

SUMMARY OF INVENTION

Technical Problem

The present invention has been made by taking the afore-mentioned circumstances into consideration. An object of the present invention is to provide an aluminum alloy foil for an electrode current collector, the foil having a high strength and high strength after the drying process while being able to be manufactured at low cost.

Solution to Problem

The present inventors have made an investigation regarding the aluminum alloy foil used for the positive electrode materials of the lithium-ion secondary batteries. Accordingly, the present inventors found that high strength can be maintained after the heat treatment during the drying process, by regulating the content of the component within an appropriate range and by manufacturing the foil by continuous casting.

That is, the first aspect of the preset invention is an aluminum alloy foil for electrode current collector, comprising:

0.03 to 1.0 mass % (hereinafter referred to as %) of Fe, 0.01 to 0.2% of Si, 0.0001 to 0.2% of Cu, 0.005 to 0.03% of Ti, with the rest consisting of Al and unavoidable impurities, wherein the aluminum alloy foil has Fe solid solution content of 200 ppm or higher, and an intermetallic compound having a maximum diameter length of 0.1 to 1.0 µm in an number density of $2.0 \times 10^4$ particles/mm$^2$ or more.

The second aspect of the present invention is a method for manufacturing an aluminum alloy foil for electrode current collector, comprising the steps of:

forming by continuous casting an aluminum alloy sheet comprising 0.03 to 1.0% of Fe, 0.01 to 0.2% of Si, 0.0001 to 0.2% of Cu, 0.005 to 0.03% of Ti, with the rest consisting of Al and unavoidable impurities, and performing cold rolling followed by foil rolling without performing heat treatment to the aluminum alloy sheet.

The following points were considered to be particularly important when achieving the present invention. That is, the following conditions of (1) aluminum alloy sheet containing four elements of Fe, Si, Cu, and Ti shall be formed by continuous casting, and (2) the aluminum alloy sheet shall be subjected to cold rolling followed by foil rolling without performing heat treatment to give the foil, need be satisfied. The inventors first made an attempt to obtain an aluminum alloy foil by forming an aluminum alloy sheet containing three elements of Fe, Si, and Cu which is substantially free of Ti, followed by cold rolling and foil rolling without performing heat treatment. However, such attempt resulted in observation of cuts during the rolling process, and thus became apparent that manufacture of the aluminum alloy foil with superior yield is difficult. Therefore, the inventors have made further investigation and found that when 0.005 to 0.03% of Ti is added, cuts during the rolling process can be suppressed, enabling the manufacture of aluminum alloy foil with high yield, thereby leading to completion of the present invention.

In addition, it became apparent that Ti can suppress occurrence of cuts during the rolling process when it is added within a limited range of 0.005 to 0.03%, however, when Ti is added with an mount exceeding such range, occurrence of cuts during the rolling process increases. Therefore, it is essential for the present invention that Ti is added within this range.

Further, there are many fine intermetallic compounds dispersed in the aluminum alloy foil manufactured by the afore-mentioned method, and the solid solution content of Fe in the aluminum alloy foil is high. This resulted in very high strength. It is noteworthy that the decrease in the strength of the aluminum alloy foil was very small even when the foil was subjected to heat treatment at about 100 to 180° C. When an electrode is manufactured using the aluminum alloy foil for electrode current collector of the present invention, heat treatment is usually performed at about 100 to 180° C. for the purpose of removing the solvent or the like. Therefore, the fact that the decrease in the strength caused by the heat treatment at such temperature range is small means that the aluminum alloy foil of the present invention has extremely superior property as the aluminum alloy foil for electrode current collector.

Advantageous Effects of Invention

According to the present invention, an aluminum alloy foil for electrode current collector, such as an aluminum alloy foil for lithium ion batteries, having high strength after a drying process after the application of the active material, can be provided. Such aluminum alloy foil is resistant from deformation during press working, thereby preventing detachment of the active material and raptures during a slitting process.

DESCRIPTION OF EMBODIMENTS

<Composition of Aluminum Alloy Foil>

The aluminum alloy foil for an electrode current collector according to the present invention comprises: 0.03 to 1.0% of Fe, 0.01 to 0.2% of Si, 0.01 to 0.2% of Cu, 0.005 to 0.03% of Ti, with the rest consisting of Al and unavoidable impurities.

Fe is an element that increases strength by addition thereof, and 0.03 to 1.0% of Fe is included. When the additive amount of Fe is less than 0.03%, there is no contribution to the improvement in strength. In contrast, when the additive amount of Fe exceeds 1.0%, coarse intermetallic compounds of Al—Fe based compound or Al—Fe—Si based compound easily crystallize during the continuous casting, which leads to unfavorable phenomena of cut during the rolling and generation of pinholes.

Si is an element that increases strength by addition thereof, and 0.01 to 0.2% of Si is included. When the additive amount of Si is less than 0.01%, there is no contribution to the improvement in strength. In addition, Si is included in a common aluminum based metal as impurities. As a result, in order to restrict the amount to less than 0.01%, a high-purity base metal should be used. This is difficult to achieve in view of economic reasons. In contrast, when the additive amount of Si exceeds 0.2%, the size of the intermetallic compound crystallized during the continuous casting becomes large, resulting in the decrease in the number of the fine intermetallic compound which contributes to the improvement in strength. Accordingly, the strength of the aluminum alloy foil decreases.

Cu is an element that increases strength by addition thereof, and 0.0001 to 0.2% of Cu is included. In order to restrict the additive amount of Cu to less than 0.0001%, a high-purity base metal should be used. This is difficult to achieve in view of economic reasons. In contrast, when the additive amount of Cu exceeds 0.2%, the work hardening increases, thereby becoming prone to cut during the foil rolling.

Ti is added by 0.005 to 0.03% as a crystal grain refining agent. By refining the crystal grain in the cast sheet after the continuous casting, occurrence of crack in the cast sheet can be prevented, and rolling property can be highly improved. When the amount of Ti added is less than 0.005%, the property as refining agent cannot be expressed, and the crystal grain would become coarse. Accordingly, the sheet would be prone to cuts during cold rolling and foil rolling. On the other hand, when the amount of Ti added exceeds 0.03%, coarse intermetallic compounds such as AlTi3 would be easily formed during the continuous casting, and thus the sheet would be prone to cuts during cold rolling and foil rolling.

With regard to other points, a material of an embodiment of the present invention contains unavoidable impurities such as Cr, Ni, B, Zn, Mn, Mg, V, and/or Zr. An amount of each of the unavoidable impurities is preferably 0.02% or less, and a total amount thereof is preferably 0.15% or less.

<Original Sheet Strength>

With regard to an aluminum alloy primarily containing Fe, Si, Cu, and Ti when each of the elements are dissolved in the aluminum alloy as much as possible and the crystals of the intermetallic compound formed during the continuous casting is dispersed uniformly and finely, dislocation movement can be reduced, thereby achieving higher strength. Further, since the cooling speed is faster in the continuous casting than the semi-continuous casting and rolling, the content of the solid solution for each of the elements increase, and thus the work hardening during processing increase. Accordingly, strength of the aluminum alloy foil can be further improved by cold rolling and foil rolling.

Tensile strength of an original sheet after final cold rolling is preferably 190 MPa or higher. Then, 0.2% yield strength thereof is preferably 170 MPa or higher. When the tensile strength is less than 190 MPa and the 0.2% yield strength is less than 170 MPa, the strength is insufficient. Consequently, tension imposed during application of an active material is likely to produce cuts and cracks.

<Strength After Heat Treatment>

A step of manufacturing a positive electrode plate includes a drying process after application of an active material so as to remove a solvent from the active material. At this drying process, heat treatment is carried out at a temperature of about 100 to 180° C. This heat treatment may cause a change in mechanical property because an aluminum alloy foil is softened. Thus, the mechanical property of the aluminum alloy foil after the heat treatment is critical. During heat treatment at 100 to 180° C., external heat energy activates dislocation and facilitates its movement. This decreases strength in the course of restoration thereof. In order to prevent the strength decrease in the course of the restoration during the heat treatment, reducing the dislocation movement by solid-solution elements or precipitates of intermetallic compound finely dispersed in the aluminum alloy is effective.

In the present invention, it is preferable that the tensile strength is 180 MPa or higher and 0.2% yield strength is 160 MPa or higher after heat treatment at 120° C. for 24 hours, at 140° C. for 3 hours, or at 160° C. for 15 minutes. The strength after the heat treatment of the present invention is greatly affected by the solid solution content of Fe which is dissolved in a supersaturated manner and by the intermetallic compound which is crystallized during the continuous casting. The faster the cooling speed during the continuous casting, the more Fe is dissolved and the more the fine intermetallic compound is crystallized, thereby improving the strength after the heat treatment. When the afore-mentioned tensile strength after heat treatment is lower than 180 MPa and 0.2% yield strength is lower than 160 MPa, the aluminum alloy foil is easily deformed during the press working after the drying process. This strength is insufficient since the adhesion between the active material and the aluminum alloy foil decreases and the aluminum alloy foil becomes prone to ruptures during a slitting process.

<Solid Solution Contend of Fe>

The aluminum alloy foil preferably has Fe solid solution content of 200 ppm or higher. In order to dissolve 200 ppm or more of Fe, Fe dissolved in the sheet in a supersaturated manner during the continuous casting should be maintained until the final foil without performing heat treatment. Fe should be dissolved as much as possible in order to maintain the strength and the strength after the drying process after the application of an active material. When the content is less than 200 ppm, it is unfavorable since the strength and the strength after the drying process after the application of an active material decreases.

<Intermetallic Compound>

Intermetallic compounds having a maximum diameter length of 0.1 to 1.0 μm exist at the surface of the aluminum alloy foil, the number of such intermetallic compound being $2.0 \times 10^4$ particles/mm². These intermetallic compounds are Al—Fe based or Al—Fe—Si based, and finely precipitate during continuous casting. These fine intermetallic compounds improve the strength of the aluminum alloy foil by dispersion strengthening, while preventing the decrease in strength after the drying process after the application of an active material.

When the number of the intermetallic compounds having a maximum diameter length of 0.1 μm or shorter is less than $2.0 \times 10^4$ particles/mm², contribution to the dispersion strengthening is small, and thus the strength decreases. The intermetallic compounds having a maximum diameter length of longer than 1.0 μm have small contribution to the improvement in strength, and may become a trigger point of pinholes. Therefore, it is preferable to suppress such intermetallic compound. In addition, in order to enhance the distribution of these intermetallic compounds, the shape of the intermetallic compounds becomes important. To suppress the dislocation movement during the drying process after the application of the active material, it is preferable that the aspect ratio, defined as the ratio of the long diameter of the intermetallic compound against the short diameter of the intermetallic compound is 3 or less. The number of the intermetallic compound can be counted by observing the surface of the aluminum alloy foil using scanning electron microscope (SEM). In particular, the surface of the aluminum alloy foil is subjected to electropolishing to give a mirror state. Then, the reflected electron image is observed at a magnification of 1000 times for 30 visual fields. The number of the intermetallic compound is quantified by using an image analyzing device. The longer side of the intermetallic compound observed as a dimensional shape in the visual field of the reflected electron image is defined as the maximum diameter length of the intermetallic compound.

<Electrical Conductivity>

Electrical conductivity is preferably 55% IACS or higher. The electrical conductivity represents a solid solution state of a solute element, particularly of Fe, Si and the like. When one use electrode current collector of the present invention for a lithium ion battery, in a case where a discharge rate exceeds 5C, which is a high current level, electrical conductivity of less than 55% IACS is not preferable because its battery capacity decrease. Note that the "1C" means a current level to complete, in one hour, the discharge from a cell having the nominal capacity value when a constant current at the current level is discharged from the cell.

<Continuous Casting and Rolling>

The aluminum alloy molten metal having the aforementioned composition is subjected to continuous casting and rolling to obtain a cast sheet. Typical continuous casting includes twin roll continuous casting and twin belt continuous casting. The twin roll continuous casting and rolling is a method which includes feeding of the aluminum alloy molten metal from a fire-resistive supply nozzle in between cooled rolls facing each other, followed by continuous casting and rolling into a thin sheet. 3C method, hunter method and the like are used in the industry. The twin belt continuous casting includes feeding the molten metal in between a pair of opposing upper and lower water-cooled circulating belts, followed by solidifying the molten metal by cooling the molten metal with the surface of the belts, thereby continuously casting and rolling into a thin sheet. The present invention may adopt either one of the twin roll continuous casting or the twin belt continuous casting, and shall not be limited to a particular manufacturing method. Here, the twin roll continuous casting requires shorter time for the cooling when compared with the twin belt continuous casting, resulting in more fine crystals of the intermetallic compound, thereby achieving aluminum alloy foil with higher performance. Hereinafter, a manufacturing method using the twin roll continuous casting as one example of the continuous casting is described.

Aluminum alloy containing Fe, Si, and Cu in the range determined by the present invention is molten to give a molten metal, and is maintained in a holding furnace. Then, the molten metal goes through a conventional degas processing and passes through a filter for removing inclusion from casting. Subsequently, the molten metal is solidified and rolled with the water cooled rolls. Ti is added to the molten metal as a crystal grain refining agent, in the form of Al—Ti mother alloy, Al—Ti—B mother alloy, Al—Ti—C mother alloy and the like. Here, as the method for adding the mother alloy, addition of the mother alloy into the holding furnace may be conducted as a waffle-like block; or may be added after the degas processing or before or after passing the filter as a rod. In the present invention, any of these methods of addition can refine the crystal grain of the cast sheet after the continuous casting, and thus can prevent cracks in the cast sheet and can improve the rolling property during the cold rolling and the foil rolling.

The temperature of the molten metal when casting by the twin roll continuous casting is preferably in the range of 680 to 800° C. The temperature of the molten metal is the temperature of the head box located immediately before the supply nozzle. When the temperature of the molten metal is lower than 680° C., intermetallic compound is formed in the supply nozzle and becomes mixed into the sheet ingot, thereby causing cut in the sheet during cold rolling. When the temperature of the molten metal exceeds 800° C., the aluminum alloy molten metal does not solidify sufficiently in between the rolls during the casting, and thus normal cast sheet cannot be obtained. The thickness of the cast sheet after the continuous casting is 20 mm or less. When the thickness of the sheet exceeds 20 mm, the solidifying speed during the continuous casting becomes slow, coarsening the crystals of the intermetallic compound, thereby decreasing the number of the fine intermetallic compound which contributes to the dispersion strengthening.

<Process After Continuous Casting>

The cast sheet obtained by the continuous casting is subjected to cold rolling followed by foil rolling to give the desired aluminum alloy foil. Heat treatment is not performed in between the cold rollings. When the heat treatment is performed, Fe which have been dissolved in a supersaturated manner during the continuous casing would partially precipitate, which leads to unfavorable decrease in strength and strength after drying process. Here, the methods for performing cold rolling and foil rolling are not limited in particular. When compared with the conventional semi-continuous casting and a conventional method which performs heat treatment after the continuous casting, the present manufacturing method can cut the manufacturing cost largely since it performs only cold rolling and foil rolling after the continuous casting.

<Thickness of the Aluminum Alloy Foil>

After the final cold rolling, the aluminum alloy foil should have a thickness of 6 to 30 μm. When the thickness is less than 6 μm, pin holes are likely to occur during foil rolling. This situation is not preferable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

The present invention will be explained in details by referring to the following Examples 1 to 10. The Examples, however, are just examples, and thus the present invention shall not be limited to the Examples.

Cast sheet with a thickness of 8 mm was prepared by the twin roll continuous casting using the aluminum alloy molten metal with the composition shown in Table 1. The cast sheet after the continuous casting was subjected to cold rolling followed by foil rolling without performing heat treatment. Accordingly, the aluminum alloy foil with the thickness of 15 μm was obtained.

Regarding Comparative Examples 11 to 16, aluminum alloy foils with the thickness of 15 μm was obtained by the twin roll continuous casting with the conditions shown in Table 1, in a similar manner as the Examples. In Comparative Example 17, cast sheet with the thickness of 8 mm after the continuous casting was subjected to cold rolling until its thickness reached 3.0 mm, followed by intermediate annealing at 400° C. for 5 hours. Then, cold rolling was performed followed by foil rolling to give an aluminum alloy foil with the thickness of 15 μm. In Comparative Examples 18 and 19, ingots with the thickness of 500 mm were cast by conventional manufacturing method of semi-continuous casting. Subsequently, homogenization treatment at 500° C. for 1 hour was performed, followed by hot rolling to give an ingot sheet with the thickness of 4 mm. Then, cold rolling was performed until the thickness reached 0.8 mm, followed by intermediate annealing at 300° C. for 4 hours using a batch furnace. After the intermediate annealing, cold rolling and foil rolling were performed continuously to give the aluminum alloy foil with the thickness of 15 μm.

TABLE 1

| No. | Method of Casting | Chemical Component (mass. %) | | | | | Heat Treatment Conditions After Continuous Casting | Foil Thickness (μm) |
| --- | --- | --- | --- | --- | --- | --- | --- | --- |
| | | Si | Fe | Cu | Ti | Al and Unavoidable Impurities | | |
| Example | | | | | | | | |
| 1 | Twin Roll | 0.03 | 0.06 | 0.009 | 0.006 | Rest | No | 15 |
| 2 | Continuous | 0.07 | 0.32 | 0.02 | 0.015 | Rest | No | 15 |
| 3 | Casting | 0.13 | 0.44 | 0.03 | 0.021 | Rest | No | 15 |
| 4 | | 0.16 | 0.79 | 0.03 | 0.028 | Rest | No | 15 |
| 5 | | 0.01 | 0.06 | 0.16 | 0.008 | Rest | No | 15 |
| 6 | | 0.03 | 0.03 | 0.01 | 0.009 | Rest | No | 15 |
| 7 | | 0.02 | 0.05 | 0.0002 | 0.007 | Rest | No | 15 |
| 8 | | 0.19 | 0.68 | 0.09 | 0.014 | Rest | No | 15 |
| 9 | | 0.14 | 0.96 | 0.15 | 0.017 | Rest | No | 15 |
| 10 | | 0.12 | 0.48 | 0.19 | 0.018 | Rest | No | 15 |
| Comparative Example | | | | | | | | |
| 11 | Twin Roll | 0.22 | 0.11 | 0.0007 | 0.009 | Rest | No | 15 |
| 12 | Continuous | 0.02 | 0.01 | 0.0008 | 0.007 | Rest | No | 15 |
| 13 | Casting | 0.18 | 1.50 | 0.12 | 0.018 | Rest | No | 15 |
| 14 | | 0.17 | 0.85 | 0.30 | 0.017 | Rest | No | 15 |
| 15 | | 0.15 | 0.36 | 0.02 | 0.001 | Rest | No | 15 |
| 16 | | 0.16 | 0.57 | 0.03 | 0.052 | Rest | No | 15 |
| 17 | | 0.08 | 0.28 | 0.02 | 0.013 | Rest | 400° C. × 5 h | 15 |
| 18 | Semi-continuous | 0.03 | 0.06 | 0.009 | 0.007 | Rest | Homogenizing Treatment 500° C. × 1 h Intermediate Annealing 300° C. × 4 h | 15 |
| 19 | Casting | 0.13 | 0.44 | 0.03 | 0.009 | Rest | | 15 |

Next, each aluminum alloy foil was used to prepare a positive electrode material for a lithium-ion secondary battery. PVDF as a binder was added to an active material primarily containing $LiCoO_2$ to yield a positive electrode slurry. This positive electrode slurry was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, number of the intermetallic compound, number of cuts occurred during foil rolling, and number of pin holes; the tensile strength and 0.2% yield strength after the heat treatment at 120° C. for 24 hours; the tensile strength and 0.2% yield strength after the heat treatment at 140° C. for 3 hours; and the tensile strength and 0.2% yield strength after the heat treatment at 160° C. for 15 minutes. Table 2 shows the results. In addition, occurrence of cut during the active material application step and the occurrence of detachment of active material was observed for each positive electrode materials. Table 3 shows the results.

TABLE 2

| No. | Original Sheet Strength Tensile Strength (N/mm²) | Original Sheet Strength 0.2% Yield Strength (N/mm²) | Electrical Conductivity (% IACS) | Solid Solution Content of Fe (ppm) | Number of Intermetallic Compounds Maximum Diameter Length 0.1 to 1.0 μm (×10⁴ particles/mm²) | Cut During Rolling | Pin Hole Density (×10⁻³ holes/m²) | Heating at 120° C. for 24 Hours Tensile Strength (N/mm²) | Heating at 120° C. for 24 Hours 0.2% Yield Strength (N/mm²) | Heating at 140° C. for 3 Hours Tensile Strength (N/mm²) | Heating at 140° C. for 3 Hours 0.2% Yield Strength (N/mm²) | Heating at 160° C. for 15 Hours Tensile Strength (N/mm²) | Heating at 160° C. for 15 Hours 0.2% Yield Strength (N/mm²) |
|---|---|---|---|---|---|---|---|---|---|---|---|---|---|
| Example | | | | | | | | | | | | | |
| 1 | 209 | 192 | 60.8 | 256 | 2.3 | No | 0.6 | 206 | 189 | 207 | 190 | 207 | 190 |
| 2 | 223 | 195 | 60.1 | 908 | 2.6 | No | 0.6 | 219 | 192 | 220 | 193 | 222 | 193 |
| 3 | 250 | 223 | 57.2 | 1124 | 2.4 | No | 0.6 | 247 | 220 | 248 | 221 | 248 | 222 |
| 4 | 295 | 258 | 56.9 | 2268 | 3.4 | No | 0.8 | 290 | 251 | 292 | 253 | 293 | 254 |
| 5 | 195 | 173 | 61.0 | 259 | 2.6 | No | 0.3 | 191 | 170 | 192 | 171 | 193 | 172 |
| 6 | 199 | 178 | 61.1 | 203 | 2.2 | No | 0.3 | 195 | 174 | 196 | 175 | 197 | 177 |
| 7 | 191 | 172 | 60.7 | 229 | 2.3 | No | 0.3 | 189 | 169 | 190 | 170 | 191 | 172 |
| 8 | 278 | 230 | 56.2 | 1546 | 3.8 | No | 1.1 | 273 | 226 | 275 | 227 | 276 | 228 |
| 9 | 292 | 250 | 55.4 | 2147 | 4.1 | No | 0.3 | 288 | 247 | 289 | 248 | 290 | 249 |
| 10 | 307 | 266 | 55.9 | 1489 | 3.0 | No | 0.6 | 303 | 262 | 304 | 263 | 305 | 265 |
| Comparative Example | | | | | | | | | | | | | |
| 11 | 188 | 167 | 60.2 | 302 | 1.1 | No | 1.4 | 177 | 153 | 176 | 154 | 182 | 161 |
| 12 | 173 | 148 | 60.7 | 23 | 1.3 | No | 0.6 | 157 | 131 | 162 | 136 | 168 | 141 |
| 13 | 224 | 187 | 55.7 | 2855 | 3.8 | No | 3.9 | 219 | 183 | 221 | 184 | 223 | 186 |
| 14 | 336 | 290 | 55.9 | 1930 | 3.1 | Yes | 1.1 | 332 | 284 | 333 | 286 | 335 | 288 |
| 15 | 232 | 201 | 56.3 | 1022 | 2.7 | Yes | 0.8 | 226 | 197 | 228 | 198 | 230 | 199 |
| 16 | 266 | 225 | 54.3 | 1344 | 2.8 | Yes | 0.8 | 260 | 221 | 262 | 223 | 264 | 224 |
| 17 | 188 | 167 | 59.7 | 59 | 2.1 | No | 0.3 | 163 | 138 | 171 | 145 | 176 | 151 |
| 18 | 160 | 141 | 63.8 | 35 | 0.2 | No | 0.3 | 134 | 112 | 145 | 121 | 152 | 133 |
| 19 | 176 | 155 | 60.9 | 39 | 0.5 | No | 0.3 | 142 | 121 | 156 | 131 | 163 | 140 |

TABLE 3

| | Positive Electrode Material | | | | | |
|---|---|---|---|---|---|---|
| | Heating at 120° C. for 24 Hours | | Heating at 140° C. for 3 Hours | | Heating at 160° C. for 15 Minutes | |
| No. | Cut during Active-material-application Step | Detachment of Active Material | Cut during Active-material-application Step | Detachment of Active Material | Cut during Active-material-application Step | Detachment of Active Material |
| Example | | | | | | |
| 1 | No | No | No | No | No | No |
| 2 | No | No | No | No | No | No |
| 3 | No | No | No | No | No | No |
| 4 | No | No | No | No | No | No |
| 5 | No | No | No | No | No | No |
| 6 | No | No | No | No | No | No |
| 7 | No | No | No | No | No | No |
| 8 | No | No | No | No | No | No |
| 9 | No | No | No | No | No | No |
| 10 | No | No | No | No | No | No |
| Comparative Example | | | | | | |
| 11 | Yes | Yes | Yes | Yes | No | No |
| 12 | Yes | Yes | Yes | Yes | Yes | Yes |
| 13 | No | No | No | No | No | No |
| 14 | No | No | No | No | No | No |
| 15 | No | No | No | No | No | No |
| 16 | No | No | No | No | No | No |
| 17 | Yes | Yes | Yes | Yes | Yes | Yes |
| 18 | Yes | Yes | Yes | Yes | Yes | Yes |
| 19 | Yes | Yes | Yes | Yes | Yes | Yes |

<Tensile Strength and 0.2% Yield Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a chuck distance of 50 mm, and at a crosshead speed of 10 mm/min. In addition, in order to simulate the drying process, heat treatment at 120° C. for 24 hours, at 140° C. for 3 hours, or at 160° C. for 15 minutes was carried out. Then, the aluminum alloy foil was cut out in a direction of the rolling. After that, the tensile strength was measured in the same manner as in the above. In addition, 0.2% yield strength was determined from a stress/strain curve.

<Solid Solution Content of Fe>

The solid solution content of Fe was measured as follows. 1.0 g of aluminum alloy foil and 50 mL of phenol were heated to 200° C. to dissolve the alloy, followed by addition of 100 mL of benzyl alcohol as an anti-caking agent. The intermetallic compound was separated by filtration, and the filtrate was measured by IPC atomic emission spectrometry.

<Electrical Conductivity>

With regard to electrical conductivity, electrical resistivity was measured by a four-terminal method, and was converted to electrical conductivity.

<Particle Number of the Intermetallic Compound>

The number of the intermetallic compound was counted by observing the surface of the aluminum alloy foil using scanning electron microscope (SEM). The surface of the aluminum alloy foil was subjected to electropolishing to give a mirror state. Then, the reflected electron image was observed at a magnification of 1000 times for 30 visual fields. The number of the intermetallic compound was quantified by using an image analyzing device.

<Pinhole Density>

A coil with a width of 0.6 m and a length of 6000 m was made from the aluminum alloy foil which was performed with foil rolling until the foil reaches a thickness of 15 μm. The number of pinholes was observed using a surface inspection machine. The number of the pinholes observed was divided by the total surface area to give the number of pinholes per 1 $m^2$ unit area. This value was taken as the pinhole density. The pinhole density of less than $2.0 \times 10^{-3}$ pinholes/$m^2$ was considered acceptable and the pinhole density of $2.0 \times 10^{-3}$ pinholes/$m^2$ or more was determined as unacceptable.

<Whether or not Cut Occurs During Active-Material-Application Step>

Whether or not a cut occurred in a positive electrode material applied during an active-material-application step was visually inspected. The case without a cut was considered acceptable, and the case with a cut was determined as unacceptable.

<Whether or not Active Material Detaches>

The presence or absence of the active material detachment was visually inspected. When no detachment occurred, the case was considered acceptable. When at least some detachment occurred, the case was determined as unacceptable.

In Examples 1 to 10, no cut occurred during the active material application step, no detachment of the active material was observed, high electrical conductivity was obtained, and thus excellent evaluation result was obtained.

In Comparative Example 11, the high content of Si resulted in small number of fine intermetallic compound, insufficient strength before and after heat treatment at 120° C. for 24 hours or at 140° C. for 3 hours, thereby causing cut during the active material application step and detachment of the active material.

In Comparative Example 12, the low content of Fe resulted in insufficient strength before and after heat treatment at 120° C. for 24 hours, at 140° C. for 3 hours, or at 160° C. for 15 minutes, thereby causing cut during the active material application step and detachment of the active material.

In Comparative Example 13, the high content of Fe resulted in generation of many pinholes.

In Comparative Example 14, the high content of Cu resulted in too high work hardening, thereby causing cut during the foil rolling.

In Comparative Example 15, the low content of Ti added resulted in coarsening of the crystal grains contained in the sheet after continuous casting, thereby causing cut during the cold rolling.

In Comparative Example 16, the high content of Ti added resulted in formation of many coarse intermetallic compounds, thereby causing cut during the cold rolling.

In Comparative Example 17, the implementation of heat treatment to the cast sheet after the continuous casting resulted in precipitation of many Fe which was dissolved in a supersaturated manner, insufficient strength before and after heat treatment at 120° C. for 24 hours, at 140° C. for 3 hours, or at 160° C. for 15 minutes, thereby causing cut during the active material application step and detachment of the active material.

In Comparative Examples 18 and 19, the adoption of semi-continuous casting resulted in insufficient strength before and after heat treatment at 120° C. for 24 hours, at 140° C. for 3 hours, or at 160° C. for 15 minutes, thereby causing cut during the active material application step and detachment of the active material.

The invention claimed is:

1. An aluminum alloy foil for electrode current collector, consisting of:
   0.03 to 1.0 mass % (hereinafter referred to as %) of Fe, 0.01 to 0.2% of Si, 0.0001 to 0.2% of Cu, 0.005 to 0.03% of Ti, Al, and unavoidable impurities, wherein an amount of each of the unavoidable impurities is 0.02% or less, and a total amount of the unavoidable impurities is 0.15% or less;
   the aluminum alloy foil has Fe solid solution content of 200 ppm or higher, and an intermetallic compound having a maximum diameter length of 0.1 to 1.0 μm in a number density of $2.0 \times 10^4$ particles/$mm^2$ or more; and
   the aluminum alloy foil has 0.2% yield strength of 170 MPa or more.

2. A method for manufacturing the aluminum alloy foil of claim 1, comprising the steps of:
   forming by continuous casting an aluminum alloy sheet consisting of 0.03 to 1.0% of Fe, 0.01 to 0.2% of Si, 0.0001 to 0.2% of Cu, 0.005 to 0.03% of Ti, Al, and unavoidable impurities, an amount of each of the unavoidable impurities being 0.02% or less, and a total amount of the unavoidable impurities being 0.15% or less; and
   performing cold rolling followed by foil rolling without performing heat treatment to the aluminum alloy sheet to produce the aluminum alloy foil, wherein the aluminum alloy foil has Fe solid solution content of 200 ppm or higher, and an intermetallic compound having a maximum diameter length of 0.1 to 1.0 μm in a number density of $2.0 \times 10^4$ particles/mm$^2$ or more, and the aluminum alloy foil has 0.2% yield strength of 170 MPa or more.

* * * * *